United States Patent [19]
Kenkel

[11] Patent Number: 5,666,539
[45] Date of Patent: Sep. 9, 1997

[54] REDUCING I/O ACTIVITY TO ALLOW A HOST BASED PRINTING SYSTEM TO ACTIVATE POWER MANAGEMENT FUNCTIONS

[75] Inventor: Vincent J. Kenkel, Boise, Id.

[73] Assignee: Hewlett-Packard Company, Palo Alto, Calif.

[21] Appl. No.: 531,264

[22] Filed: Sep. 20, 1995

[51] Int. Cl.⁶ ........................................... G06F 1/32
[52] U.S. Cl. ........................ 395/750.03; 395/835
[58] Field of Search ...................... 395/750, 835–839; 364/707

[56] References Cited

U.S. PATENT DOCUMENTS

| | | | |
|---|---|---|---|
| 4,922,450 | 5/1990 | Rose et al. | 395/750 |
| 5,167,024 | 11/1992 | Smith et al. | 395/375 |
| 5,396,635 | 3/1995 | Fung | 395/800 |
| 5,461,266 | 10/1995 | Koreeda et al. | 307/125 |
| 5,504,907 | 4/1996 | Stewart et al. | 395/750 |
| 5,548,763 | 8/1996 | Combs et al. | 395/750 |

*Primary Examiner*—Jack B. Harvey
*Assistant Examiner*—Sumati Lefkowitz

[57] ABSTRACT

Reducing I/O port activity allows a period of inactivity to trigger the power save mode in computers. The user declares the period of inactivity. The printing system retrieves the period and relaxes the port activity by gradually lengthening the period between port accesses until the user designated value is reached. This relaxation happens under two circumstances; when the printer is idle and during communication errors. The period between port accesses is reinitialized to the normal value when a print job starts. Additionally, when the computer is awoken from the power save mode, either directly or indirectly, the port access period is shortened to its normal value. The printing system immediately starts to relax the frequency of port accesses as described above.

7 Claims, 3 Drawing Sheets

REDUCING I/O ACTIVITY TO ALLOW A HOST BASED PRINTING SYSTEM TO ACTIVATE POWER MANAGEMENT FUNCTIONS

TECHNICAL FIELD

The present invention relates to printing systems, and more particularly to power management support for active I/O port connection systems.

BACKGROUND OF THE INVENTION

Host based printing, also referred to as "sleek" printing, is the concept of using the personal computers central processing unit (CPU) to render the printed image and send the rasterized image to the page printer. Currently there are two categories of printing systems, intelligent and dumb. The dumb category is the host based, or sleek, approach. The intelligent category differs in that it sends a mixture of rendered and non-rendered to the printer. It is similar to the concept of page description language (PDL) page printers like the Hewlett-Packard PCL page printers, in that the data sent across the I/O channel needs to be processed and rendered by the printer. A dumb printer only has to deal with placing an already rasterized image on paper, whereas the intelligent printer requires additional technology in the printer such as additional memory and processing power, to form the page for printing before starting the printing process.

Intelligent laser printers receive data to be printed from a host computer in the form of a control language over a standard interface. The control language data stream includes print function commands with interspersed print data. The laser printer responds by converting the received data stream into a list of simple commands, called display commands which describe what must be printed. The printer processes the display commands and renders the described objects into a raster bit map. This procedure generally requires a full page raster bit map memory, as the same memory is used for succeeding pages.

The use of control Languages to enable data transfers between host computers and laser printers is widespread and must be accommodated on a commercial laser printer if that printer is to appeal to a large customer base. Such control language data is transferred to the laser printer over a standard, input/output (I/O) interface that exhibits a rather slow data transfer rate. Using that interface, a laser printer converts an incoming command language data stream into a "page intermediate" form (consisting of display commands) which is then converted to raster image data. The raster image data conversion process causes the intermediate page representation to be divided into a number of strips, with groups of the strips being sequentially processed to raster pixel data (video data for the print engine). The print engine is only started after an initial group of strips have been converted to raster pixel data. At this time the laser print engine prints the data and continues at a fixed speed, until all strips have been printed. If new rasterized data is not available at a rate that keeps up with the print engine's operation, a print "overrun" occurs and the page is not printable. As a result, considerable time is lost due to the substantial preprocessing which must occur before the print engine is started.

Some page printers employ a high speed page printing technique termed the "Sleek" mode that avoids the substantial preprocessing that occurs when print data is transferred using a print control language. In the Sleek mode, the host computer converts user input data into a full raster pixel image and then feeds that raster image as pixel data, over an interface at a high data transfer rate. Certain prior art page printers employ a separate video port that accepts video raster image data at a multi-megabit per second rate. While such printers provide highly efficient print rates, the costs inherent in the separate video ports on both the printer and the host and circuitry for handling data over those ports adds substantially to the system's cost. Nevertheless, the Sleek mode may enable a substantial increase in print speed of a laser page printer.

The most popular sleek printing system for personal desktop computers allows complete host computer control over a printed page. In this sleek printing system, the host rasterizes all page data and sends page information and print control parameters to the page printer. By utilizing a high performance microprocessor on the host computer, the page image can be rasterized faster than letting the lower performance printer rasterize the image. Control of the printing process is provided by the host using logical channels over an IEEE 1284 compliant parallel port. Logical channels provide the means for page definition, page control and status gathering.

Some printing systems for personal desktop computers are designed to give the user valid printer status 100% of the time, even during idle time. Examples of such status include messages indicating out of paper, toner problems and the like. In order to provide valid status, the host accesses the printer through the I/O ports several time a second. This I/O port activity causes complications for computers with power management systems that monitor the I/O activity.

Power management typically uses an internal timer to determine when to engage the powers savings features. Each time the I/O port is accessed, the timer is reset. Consequently, with the port accessed several times a second, the power management is never allowed to engage, thus draining the batteries.

When communication fails between the host and the printer, such as when the printer is disconnected, the host continues to access the I/O port in an attempt to reconnect with the printer. Thus, even if the printer is not attached, the power management does not engage. Even if the user manually invokes the computer's power saver mode, problems may still arise. For example, many battery powered computer (as referred to as laptop computer, or just laptops) have a daily planner application with an alarm feature. The alarm feature "wakes" the laptop computer out of the power saver mode to notify the user of an impending appointment. Once the laptop computer is "awake", the printing systems starts to access the I/O port either gathering status, or trying to connect to the printer. As described above, the constant I/O port activity prevents the power management from placing the laptop in a power saving mode. After a period of time, the batteries are drained.

One method of preventing the I/O port access, and thereby avoiding the power save problems, requires that the user change the logical port connection from "LPTx" to "FILE". However, this kind of solution is not attractive because it requires that the user make the change each time they desire the power save feature to operate. Additionally, it requires the user reverse the change prior to printing.

The Advanced Power Management (APM) specification attempts to standardize power management implementation. While many computer manufactures use APM, implementations still differ enough that the declaration of APM compliance is no guarantee that one computer behaves that same as another with regard to power management.

SUMMARY OF THE INVENTION

In order to accomplish the present invention there is provided a method for allowing a computer, which is connected to a printer, to enter a power save mode. The computer includes a timer that is indicative of an amount of time elapsed from a previous communication between the computer and the printer. First a predefined variable, "maximum interval" is retrieved from a storage device. Next, the computer sets an access interval to an initial value. Any time the computer has print job to send to the printer, the access interval is reset to the initial value and the job is sent. However, the computer may receive information from the printer only when the timer value is greater than the access interval. Finally, when the timer value is greater than the access interval, the access interval is increased, provided it is less than the maximum interval. Additionally, when the computer exits the power save mode, either directly or indirectly, the access interval is reset to its initial value.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

Figure 1:
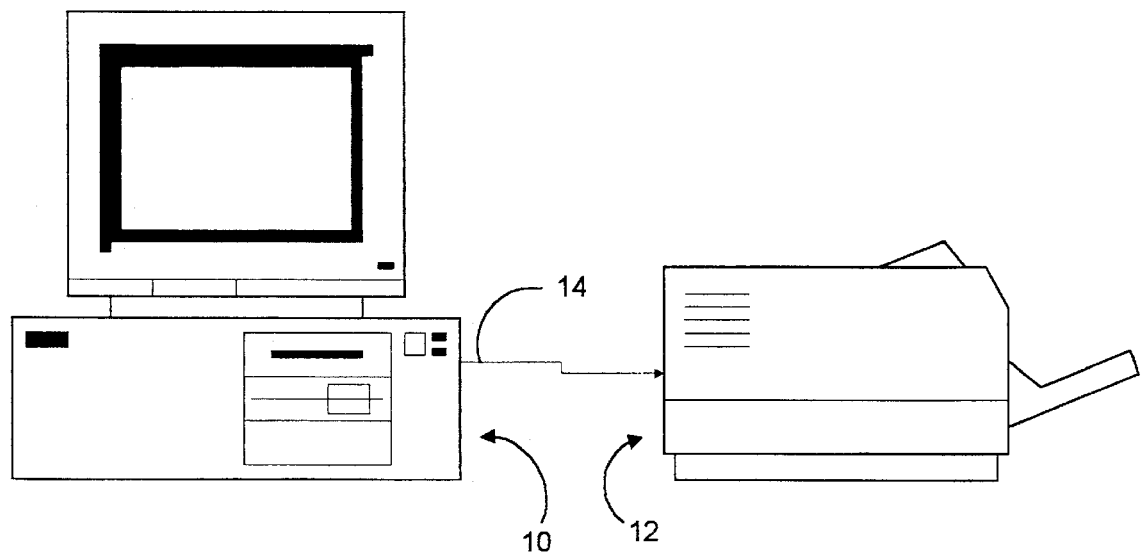
FIG. 1 is a block diagram showing a host computer connected a page printer.

The present invention is not limited to a specific embodiment illustrated herein. Referring to FIG. 1, the present invention reduces the I/O activity over cable 14 between host computer 10 and printer 12 to allow a period of inactivity that is at least as long as the host's 10 time-out that triggers the power save mode. Automatically obtaining the actual time-out period is difficult because there is no APM defined standard for storing or obtaining this value. Given that computer manufactures often take liberties in implementing APM, reduces the likelihood that any single approach will guarantee an accurate time-out period. Additionally, many power management implementations may use one time-out value for hard-drive activity, another for keyboard activity, others for similar functions. Therefore the only way to reliably determine the time-out period is to require the user declare the period.

The printing system within the host 10 obtains the declared value for the designated period of inactivity by retrieving a variable "MaxComminterval". In the preferred embodiment of the present invention, the MaxCommInterval value is measured in seconds. Thus, if MaxCommInterval is equal to 80, this directs the printing software in the host 10 to relax the frequency of I/O port accesses such that a period of 80 seconds of inactivity occurs between subsequent accesses. The printing system relaxes the port activity by gradually lengthening the period between port accesses until the designated value is reached. Relaxation happens under two circumstances: first, when the printer 12 is idle, that is the printer 12 is connected with no print activity; and second, during a print communication error, which occurs when the printer 12 is not properly connected or turned off.

The host computer 10 reinitializes the period between port accesses to the normal value when a print job starts. Additionally, when the host 10 is awoken from the power save mode, either directly or indirectly, the port access period is shortened to its normal value. The printing system in host 10 immediately starts to relax the frequency of port accesses as described above.

Figure 2:
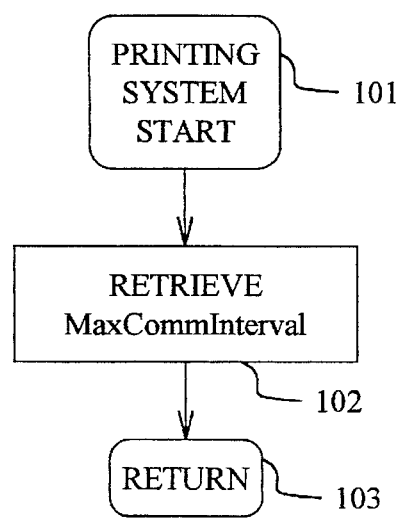
FIG. 2 is a flow diagram showing the initialization procedure.

Referring now to FIG. 2. When the printing system in the host 10 is first started 101, the "MaxCommInterval" variable is retrieved 102. As stated above, the "MaxCommInterval" variable is pre-defined by the user. To prevent the need for redefinition each time the computer is turned on, the variable is stored in a non-volatile storage device, such as a hard disk.

Figure 3:
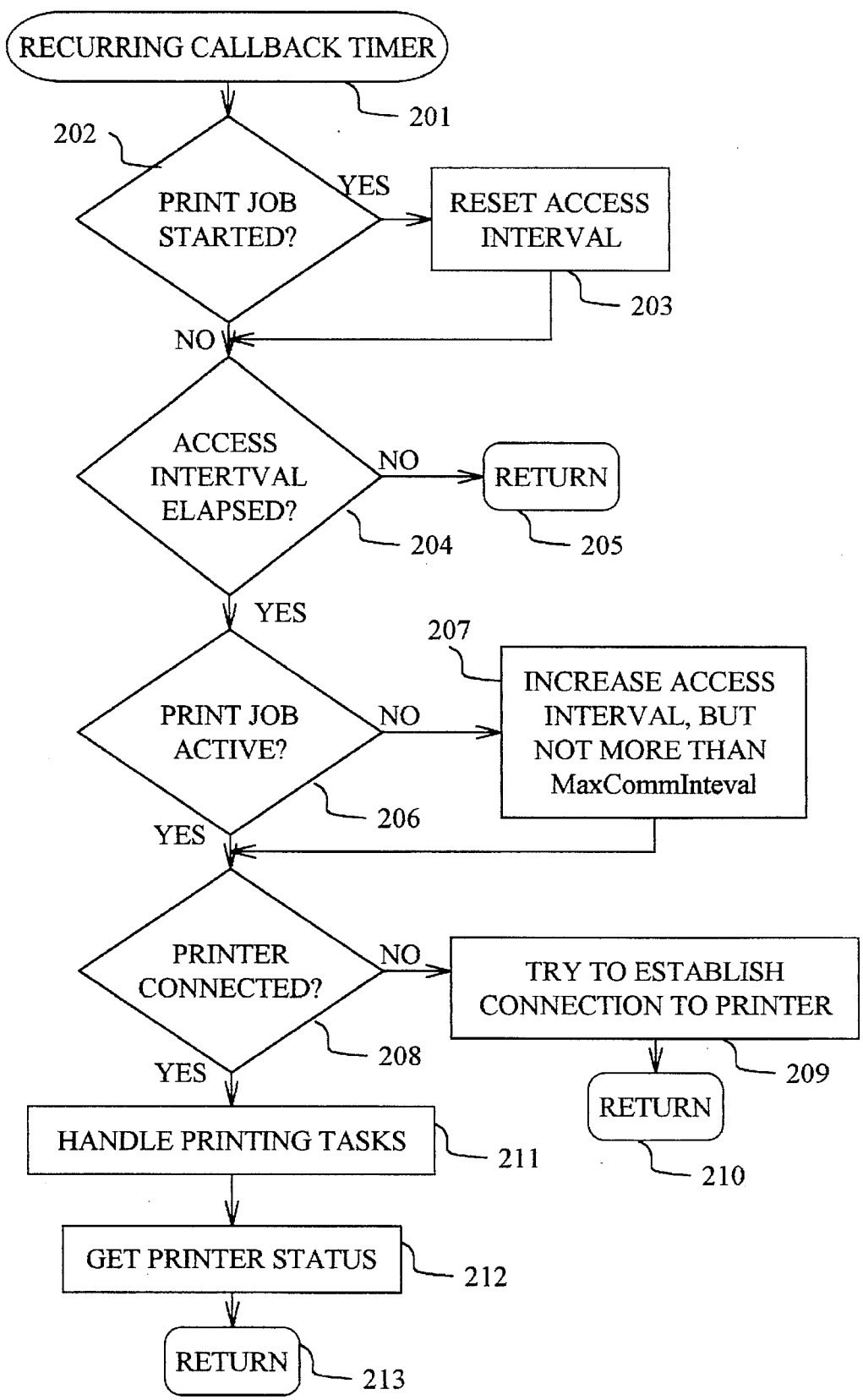
FIG. 3 is a flow diagram showing the preferred embodiment of the present invention.

Referring now to FIG. 3 where a flow chart of the preferred embodiment is shown. Each time the call-back timer requires service indicating that the printer 12 should be accessed 201, it is first determined if a print job has started 202. If the print job has started, then the port access interval is reset to the nominal value 203. If the port access interval has not already elapsed 204, then execution is allowed to continue for other parts of the system 205. Assuming that the port access interval has elapsed, a determination is made as to whether the printer 12 is currently active 206. If the printer is not active port access interval is increased 207 provided it is less than MaxCommInterval. If the printer 12 is no longer connected 208, an attempt is made to reestablish connection to the printer 209. However, if the printer 12 is connected, any outstanding printing tasks are taken care of 211 and the printer status is retrieved 213.

As long as the port access interval has not expired, processing is diverted at 204 to 205. Thus, during the port access interval period, no activity occurs on the I/O port 14 as a result of the call-back timer. Only after the port access interval has elapsed, is I/O port activity allowed in, for example 209, 211 and 213. Assuming MaxCommInterval has been properly identified, eventually the power management system allows the computer 10 to power down before the port access interval has elapsed.

Figure 4:
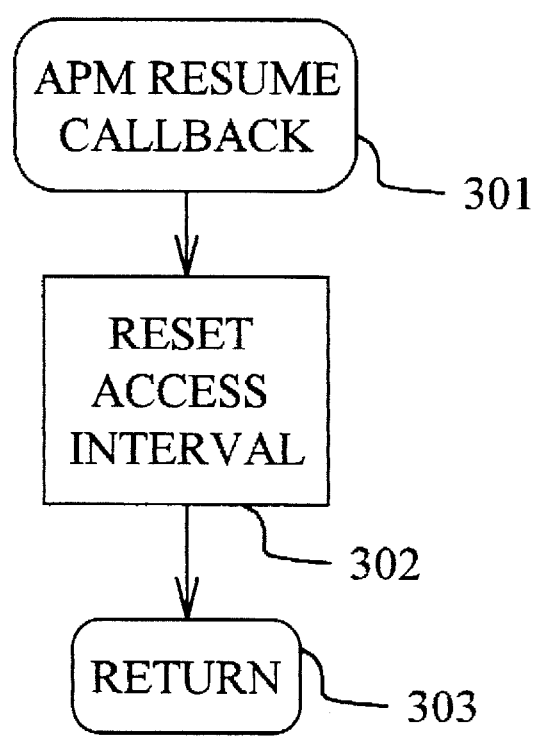
FIG. 4 is a flow diagram showing the Advanced Power Management resume procedure.

Finally, FIG. 4 shows that during an APM resume, where the computer 10 is awakened from the power save mode, the port access interval is reset 302.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for allowing a computer including a power management system to enter a power save mode, said computer being connected to a printer, said computer including a timer that is indicative of an amount of time elapsed from a previous communication between said computer and said printer, said method comprising the steps of:

invoking a host based printing system;

retrieving a maximum interval where said maximum interval is greater than an interval of communications between said computer and said printer that allows activation of said power save mode;

setting an access interval to a first value;

resetting said access interval to said first value if said computer has information to send to said printer and allowing said computer to send said information;

preventing said computer from retrieving information from said printer if said timer is less than said access interval;

permitting said computer to access said printer if said timer is greater than said access interval; and incrementing said access interval if said access interval is less than said maximum interval and said computer has no information to send said printer, thereby forcing upon said computer periods of inactivity which will allow said power management system to cause said computer to enter said power save mode.

2. The method of claim 1 further comprising the steps of:

defining said maximum interval; and storing said maximum interval.

3. The method of claim 1 further comprising the step of resetting said access interval to said first value when said computer exits said power save mode.

4. A method for allowing a computer including a power management system to enter a power save mode, said computer being connected to a printer, said computer including a timer that is indicative of an amount of time elapsed from a previous communication between said computer and said printer, said method comprising the steps of:

invoking a host based printing system;

defining a maximum interval where said maximum interval is greater than an interval of communications between said computer and said printer that allows activation of said power save mode;

storing said maximum interval;

retrieving said maximum interval;

setting an access interval to a first value;

resetting said access interval to said first value if said computer has information to send to said printer and allowing said computer to send said information;

preventing said computer from retrieving information from said printer if said timer is less than said access interval;

permitting said computer to access said printer if said timer is greater than said access interval; and incrementing said access interval if said access interval is less than said maximum interval and said computer has no information to said to said printer, thereby forcing upon said computer periods of inactivity which will allow said power management system to cause said computer to enter said power save mode.

5. The method of claim 4 further comprising the step of resetting said access interval to said first value when said computer exits said power save mode.

6. A system including a computer and a printer, said system comprising:

host based printing system;

power saving means for reducing power consumption of said computer, said power saving means being activated after a minimum period of inactivity between said computer and said printer;

timer of a period of inactivity;

storage device, said storage device stores a maximum interval variable, said maximum interval variable being greater than said minimum period; and controller means for retrieving said maximum interval variable from said storage device, said controller means setting an access interval to a first value when said computer has information to send to said printer, said controller means further operates such that if said timer is less than said access interval, said controller means prevents said computer from retrieving information from said printer, and alternatively, if said timer is greater than said access interval, said controller means allows said computer to retrieve information from said printer and increments said access interval if said access interval is less than said maximum interval variable, thereby forcing upon said computer periods of inactivity which will allow said power saving means to be activated.

7. The system of claim 6 wherein said controller means sets said access interval to said first value when said computer exits said power saving means.

* * * * *